United States Patent [19]

Lee

[11] 4,332,925

[45] Jun. 1, 1982

[54] MODIFIED POLYAMIDEIMIDE RESINS

[75] Inventor: Yue-guey L. Lee, Schenectady, N.Y.

[73] Assignee: General Electric Company, New York, N.Y.

[21] Appl. No.: 249,210

[22] Filed: Mar. 30, 1981

[51] Int. Cl.³ ............................................. C08G 18/00
[52] U.S. Cl. ....................................... 528/48; 528/52; 528/53; 528/67; 528/73
[58] Field of Search ....................... 528/67, 73, 52, 48, 528/53

[56] References Cited

U.S. PATENT DOCUMENTS

| | | | |
|---|---|---|---|
| 3,541,038 | 11/1970 | Nakano et al. | 260/30.6 |
| 3,578,639 | 5/1971 | Sheffer. | |
| 3,865,785 | 2/1975 | Pauze | 260/33.4 P |
| 3,884,880 | 5/1975 | Disque et al. | 260/18 TN |

OTHER PUBLICATIONS

Journal of Polymer Science, Pt. A-1, vol. 8, pp. 683–692, (1970), S. Terney et al.
Technical Service Report, "Isonate® 143L–Liquid MDI", Upjohn Polymer Chem. Div.

Primary Examiner—Maurice J. Welsh
Attorney, Agent, or Firm—Hedman, Casella, Gibson & Costigan

[57] ABSTRACT

Polyamideimides prepared by polycondensation of trimellitic anhydride, diphenyl methane diisocyanate and an isocyanate mixture are provided. These preparations exhibit low viscosity in high-solids solutions and are useful as wire enamels and topcoats over polyester and polyesterimide base coats.

14 Claims, No Drawings

MODIFIED POLYAMIDEIMIDE RESINS

BACKGROUND OF THE INVENTION

This invention relates to modified polyamideimide resins of high solids content solutions with unexpectedly low viscosity.

It is known from Nakano et al., U.S. Pat. No. 3,541,038; Sheffer, U.S. Pat. No. 3,578,639; and Disque et al., U.S. Pat. No. 3,884,880 that high molecular weight polyamideimide resins can be formed by condensing one mole of a tribasic acid anhydride, such as trimellitic anhydride, with 1.00 to 1.06 moles of a diisocyanate compound, such as diphenyl methane diisocyanate, at a temperature of about 60° C. to 150° C. in the presence of an inert solvent.

These resins have good electrical insulation properties but begin to decompose, i.e., suffer loss in molecular weight, at temperatures below 300° C.

It has now been found that the heat resistance of polyamideimide resins can be improved by partially substituting for the diisocyanate used in making such resins an isocyanate mixture containing a diisocyanate of the formula

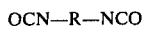

OCN—R—NCO and a triisocyanate of the formula

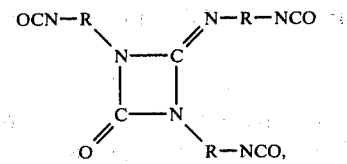

or an isocyanate system in equilibrium comprising a diisocyanate of the formula

OCN—R—NCO and its cyclotriisocyanate adduct having the formula

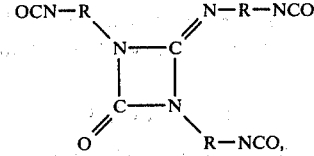

which is prepared by reacting the diisocyanate with carbodiimide of the formula

OCN—R—N=C=N—R—NCO in a manner known in this art. In all of the above formulae, R is an organic divalent radical of from 2 to 30 carbon atoms, optionally containing —O—, —SO$_2$— and —S— groups.

Preferably, R will be selected from the following radicals:

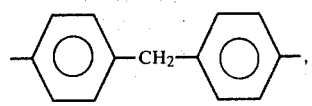

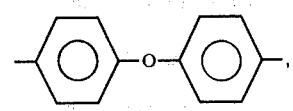

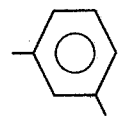

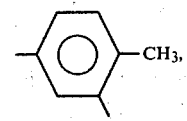

—(CH$_2$)$_6$—,

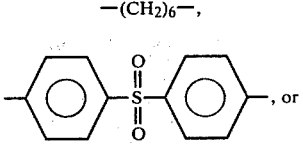, or

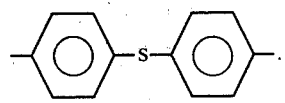.

Further it is found that partial substitution, i.e., up to about 25 mole percent, of the diisocyanate with a di- and tri-isocyanate mixture or equilibrium system gives a polyamideimide resin having surprising polymer solution stability and unexpectedly low viscosity which maintains its flexibility as a cured film. This combination of solution stability at high solids contents, low viscosity and flexibility after curing makes the present invention especially useful as a coating or wire enamel.

DESCRIPTION OF THE INVENTION

The present invention provides a polyamideimide having relatively low viscosity in high solids content solutions prepared from the following components:
 (a) trimellitic anhydride;
 (b) an isocyanate mixture comprising
  (i) from 75 to 99 mole % of a diisocyanate of the formula OCN—R—NCO, and
  (ii) from 25 to 1 mole % of an isocyanate mixture comprising a diisocyanate of the formula OCN—R—NCO, and a triisocyanate of the formula

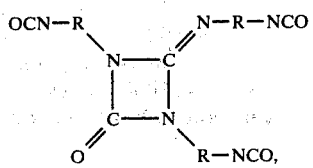

where R is a divalent hydrocarbon radical of from 2 to 30 carbon atoms, optionally containing —O—, —SO$_2$— and —S— groups.

Alternatively, the substituent component (b)(ii) can be an isocyanate system in equilibrium prepared in known ways from a diisocyanate of the formula

OCN—R—NCO which is reacted with carbodiimide having the formula

OCN—R—N=C=N—R—NCO to produce a cycloadduct of the formula

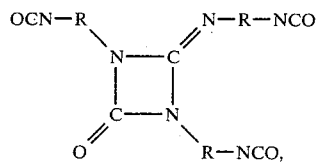

which is in equilibrium with the diisocyanate and forms a suitable substituent system.

The components, (a), (b)(i) and (b)(ii), are subjected to polycondensation at a temperature of from about 60° C. to 150° C. in the presence of an inert solvent or solvent mixture, and a catalyst for the polycondensation. Components (a) and (b) should be mixed in roughly equal portions. Preferred blends will have an equivalent ratio of components (a), (b)(i) and (b)(ii) of about 1:(0.891–0.909):(0.099–0.101).

The preferred substituent in the polycondensation described hereinabove is an equilibrated system where diphenyl methane diisocyanate is the diisocyanate from which the cyclotriisocyanate is made. This diisocyanate-triisocyanate equilibrium mixture is available commercially from the Upjohn Company as "Isonate 143L". The percentages of diisocyanate and triisocyanate in "Isonate 143L" are calculated to be 83.68% and 16.32% respectively at room temperature. The triisocyanate adduct dissociates at elevated temperatures and has a half life at 100° C. of 58 minutes. Thus, its effective isocyanate equivalent weight will vary from 143 at low temperatures (e.g., below 30° C.) to 136 at higher temperatures (e.g., above 120° C.). See "Technical Service Report: Isonate® 143L 'Liquid MDI'", distributed by the Upjohn Company, incorporated herein by reference.

Many suitable solvents are known and there is no criticality in their selection. Any solvent or solvent mixture which will dissolve the particular resin components is suitable. Preferred, however, are methylpyrrolidone, dimethylacetamide and the like.

The preferred catalysts for the polycondensation are imidazoles and imidazolines in amounts from 0 to 10 equivalent percent. Especially preferred is 2-methylimidazole.

In addition to these essential elements, the present compositions may optionally contain such common enamel additives as delustrants and pigments.

The resultant polyamideimide is useful as a topcoat wire enamel over polyester or polyesterimide base coats.

EXAMPLE 1

A polyamideimide wire enamel is prepared from the following ingredients:

| COMPOUND | AMOUNT IN GRAMS |
|---|---|
| TMA[a] | 576 |
| MDI[b] | 681.75 |
| substituent MDI system in equilibrium ("liquid MDI")[c] | 82.42 |
| NMP ®[d] | 1916.8 |
| Solvesso 100 ®[e] | 833.4 |
| 2-MeIM[f] | 12.3 |

[a]trimellitic anhydride
[b]diphenyl methane diisocyanate
[c]Isonate 143L ®, Upjohn Company
[d]methylpyrrolidone, GAF Corporation
[e]naptha solvent
[f]2-methylimidazole (catalyst)

The above ingredients are placed in a 5-liter reaction vessel, stirred, and heated from room temperature to 135° C. in about two hours. This temperature is held for four hours. The enamel produced has a Gardner viscosity of (691–755 cs) U ¼–U ½ and a solids content of 32%. 1700 grams of this product is removed, filtered and labeled Sample A.

The remaining mixture is heated continuously at 135° C. for an additional 5½ hours until a Gardner viscosity of Y1 (1760 cs) is obtained. This enamel is filtered and labeled Sample B. The solids content of Sample B is 32%.

Both samples are applied to copper magnet wire already coated with "Isonel 678" polyester enamel base coat. Unexpectedly high cut through temperatures in a range from 395° C. to 423° C. for Sample A, and from 405° C. to 417° C. for Sample B, are observed.

Similar heat resistance is obtained when the the samples are used as topcoats over an "Imidex" polyesterimide enamel base coat. Sample A had a cut through temperature range of 391° C. to 418° C.; Sample B, 388° C. to 426° C.

EXAMPLE 2

As a control, the MDI component of Example 1 is completely replaced by the substituent, "liquid MDI", as follows:

| COMPONENT | AMOUNT IN GRAMS |
|---|---|
| TMA | 384 |
| Isonate 143L "liquid MDI" | 594.44 |
| NMP | 1283.3 |
| xylene | 557.96 |
| 2-MeIM | 8.2 |

This mixture is stirred and heated to 135° C. in approximately one hour. After two hours' reaction at 135° C., gel is formed.

EXAMPLE 3

A polyamideimide wire enamel is prepared from the following ingredients:

| COMPONENT | AMOUNT IN GRAMS |
|---|---|
| TMA | 576 |
| MDI | 712.5 |
| Isonate 143L "liquid MDI" | 40.8 |
| NMP | 1333.08 |
| Solvesso 100 | 579.69 |
| 2-MeIM | 12.3 |

The ingredients are mixed, stirred and heated to 135° C. in approximately one hour. This mixture is then cut with additional solvent—220 g of NMP, 96 g of Solvesso 100—and further reacted, with heat being reapplied when the mixture reaches room temperature until 135° C. is again reached. This cooling-heating procedure is repeated (without adding more solvent), and the final product allowed to cool to room temperature. The solids content is 37%, the Gardner viscosity is Z1 (2700 cs).

This preparation is filtered and applied to copper magnet wire coated with an "Isonel 678" polyester enamel base coat. Cut through temperature is 394° C.

The foregoing examples demonstrate that the present invention provides an improved polyamideimide resin, stable in high-solids solutions and exhibiting unusually low viscosity, having improved heat resistance and being useful as a wire enamel topcoat over polyester and polyesterimide base coats.

It will be understood that changes may be made in the particular embodiments of the invention in light of the above teachings and that these will be fully within the scope of the invention as defined by the appended claims.

I claim:

1. A polyamideimide having relatively low viscosity in high-solids solutions prepared from the following components:
   (a) trimellitic anhydride; and
   (b) an isocyanate mixture comprising
      (i) from 75 to 99 mole % of a diisocyanate of the formula OCN—R—NCO,
      and
      (ii) from 25 to 1 mole % of an isocyanate mixture comprising a diisocyanate of the formula OCN—R—NCO,
      and
      a triisocyanate of the formula $$\text{OCN—R} \underset{\underset{O}{\overset{\|}{C}}-N}{\overset{N-C}{\underset{}{|}}} \overset{N-R-NCO}{\underset{R-NCO,}{}}$$

where R is a divalent hydrocarbon radical of from 2 to 30 carbon atoms, optionally containing —O—, —$SO_2$— and —S— groups; said components being subjected to polycondensation at a temperature of about 60° C. to 150° C. in the presence of an inert solvent comprising methylpyrrolidone and a catalyst for polycondensation.

2. A polyamideimide prepared as in claim 1 where R is selected from

-⟨O⟩-CH$_2$-⟨O⟩-,

-⟨O⟩-O-⟨O⟩-,

-continued

-⟨O⟩-,

-⟨O⟩-CH$_3$,

-(CH$_2$)$_6$-,

-⟨O⟩-S(=O)$_2$-⟨O⟩-, or

-⟨O⟩-S-⟨O⟩-

3. A polyamideimide prepared as in claim 1 where R has the formula

-⟨O⟩-CH$_2$-⟨O⟩-

4. A polyamideimide prepared as in claim 3 where the equivalent ratio of components (a), (b)(i) and (b)(ii) is 1:(0.891–0.909):(0.099–0.101).

5. A polyamideimide prepared as in claim 1 where the catalyst is 2-methylimidazole.

6. A polyamideimide prepared as in claim 1 where the solvent further comprises xylene.

7. A polyamideimide prepared as in claim 1 where the solvent further comprises naphtha solvent.

8. A polyamideimide having relatively low viscosity in high-solids solution prepared from the following components:
   (a) trimellitic anhydride;
   (b) an isocyanate mixture comprising:
      (i) from 75 to 99 mole % of a diisocyanate of the formula OCN—R—NCO;
      and
      (ii) an equilibrated isocynate system comprising a diisocyanate of the formula

OCN—R—NCO and its cyclotriisocyanate adduct having the formula $$\text{OCN—R} \underset{\underset{O}{\overset{\|}{C}}-N}{\overset{N-C}{\underset{}{|}}} \overset{N-R-NCO}{\underset{R-NCO,}{}}$$

produced by reaction of the diisocyanate with a carbodiimide of the formula

OCN—R—N=C=N—R—NCO, where R is a divalent hydrocarbon radical of from 2 to 30 carbon atoms, optionally containing —O—, —SO$_2$— and —S— groups; said components being subjected to polycondensation at a temperature of about 60° C. to 150° C. in the presence of an inert solvent comprising methylpyrrolidone and a catalyst for polycondensation.

9. A polyamideimide prepared as in claim 8 where R is selected from

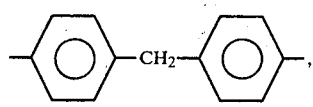

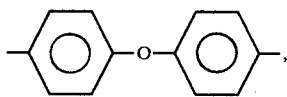

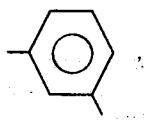

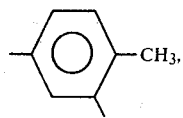

—(CH$_2$)$_6$—,

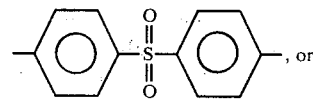

, or

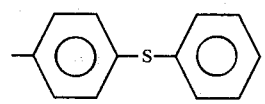

10. A polyamideimide prepared as in claim 8 where R has the formula

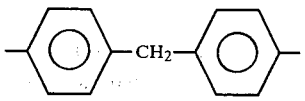

11. A polyamideimide prepared as in claim 10 where the equivalent ratio of components (a), (b)(i) and (b)(ii) is 1:(0.891–0.909):(0.099–0.101).

12. A polyamideimide prepared as in claim 8 where the catalyst is 2-methylimidazole.

13. A polyamideimide prepared as in claim 8 where the solvent further comprises xylene.

14. A polyamideimide prepared as in claim 8 where the solvent further comprises naphtha solvent.

* * * * *

UNITED STATES PATENT AND TRADEMARK OFFICE
CERTIFICATE OF CORRECTION

PATENT NO. : 4,332,925
DATED : June 1, 1982
INVENTOR(S) : Yue-Guey L. Lee

It is certified that error appears in the above—identified patent and that said Letters Patent is hereby corrected as shown below:

Please correct the above-identified patent as follows:

In Claim 2, col. 6, line 23 the radical should appear as follows:

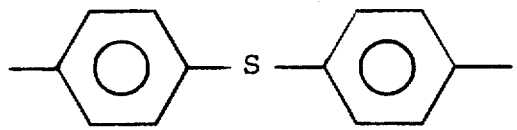

In Claim 9, col. 8, line 16 the radical should appear as follows:

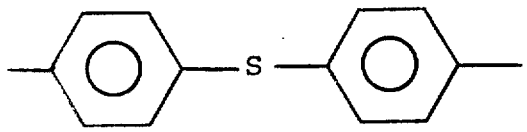

Signed and Sealed this

Fifth Day of October 1982

[SEAL]

Attest:

Attesting Officer

GERALD J. MOSSINGHOFF
Commissioner of Patents and Trademarks